US012566445B2

(12) United States Patent
Boone et al.

(10) Patent No.: US 12,566,445 B2
(45) Date of Patent: Mar. 3, 2026

(54) MATERIAL MOVEMENT CONTROL WITH SWARM POWER GENERATING ROBOTS

(71) Applicant: INTERNATIONAL BUSINESS MACHINES CORPORATION, Armonk, NY (US)

(72) Inventors: Michael Boone, Lutz, FL (US); Sarbajit K. Rakshit, Kolkata (IN); Randy A. Rendahl, Raleigh, NC (US); Carolina Garcia Delgado, Zapopan (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 18/493,994

(22) Filed: Oct. 25, 2023

(65) Prior Publication Data
US 2025/0138538 A1 May 1, 2025

(51) Int. Cl.
| | |
|---|---|
| *G05D 1/00* | (2024.01) |
| *B64U 10/00* | (2023.01) |
| *B64U 101/10* | (2023.01) |

(52) U.S. Cl.
CPC ........... *G05D 1/0297* (2013.01); *B64U 10/00* (2023.01); *B64U 2101/10* (2023.01)

(58) Field of Classification Search
CPC .. G05D 1/0297; B64U 10/00; B64U 2101/10; G05B 2219/40304; G05B 2219/45073;
(Continued)

(56) References Cited

U.S. PATENT DOCUMENTS

| | | |
|---|---|---|
| 10,418,863 B1 | 9/2019 | Jadidian |
| 2019/0224852 A1* | 7/2019 | Choi ........................ B25J 11/00 |

(Continued)

FOREIGN PATENT DOCUMENTS

| | | |
|---|---|---|
| CN | 113653612 A | 11/2021 |
| CN | 114415731 A | 4/2022 |

(Continued)

OTHER PUBLICATIONS

Gross et al., "Autonomous Self-assembly in Swarm-bots", IEEE Transactions on Robotics, Dec. 1, 2006, pp. 1115-1130, vol. 22, Issue: 6.

(Continued)

*Primary Examiner* — Anne Marie Antonucci
*Assistant Examiner* — Jodi Jones
(74) *Attorney, Agent, or Firm* — Tutunjian & Bitetto, P.C.; Eric Chesley

(57) ABSTRACT

An embodiment for controlling material movement with swarm power generating robots in a multi-machine environment is provided. The embodiment may include receiving data relating to an activity and one or more material handling devices to perform the activity. The embodiment may also include identifying one or more characteristics of one or more objects associated with the activity. The embodiment may further include predicting an amount of power required to transport the one or more objects. The embodiment may also include in response to determining at least one material handling device is unable to produce the required amount of power, identifying one or more power generation robots capable of transmitting the required amount of power to the at least one material handling device. The embodiment may further include deploying the one or more power generation robots to a target location of the at least one material handling device.

20 Claims, 3 Drawing Sheets

(58) Field of Classification Search
CPC . G05B 2219/39146; G05B 2219/40434; B25J 9/1679; B25J 9/1682
USPC .. 701/23, 2, 25, 700, 245, 248, 93, 300, 28, 701/408, 1, 532, 41, 469, 120, 36, 482, 701/517, 422, 527, 122, 110, 467, 400, 701/409, 410, 411, 420
See application file for complete search history.

(56) References Cited

U.S. PATENT DOCUMENTS

| | | | |
|---|---|---|---|
| 2021/0060801 A1* | 3/2021 | Kwak | B25J 9/0084 |
| 2022/0236743 A1 | 7/2022 | Yoshikuwa | |
| 2023/0113279 A1* | 4/2023 | Romero | B60L 58/12 701/50 |
| 2023/0191935 A1* | 6/2023 | Alsalloum | B60L 53/14 320/109 |
| 2023/0226940 A1* | 7/2023 | Heitmann | B60L 53/38 701/22 |
| 2023/0294528 A1* | 9/2023 | Messina | H02J 7/007194 701/22 |

FOREIGN PATENT DOCUMENTS

| | | |
|---|---|---|
| CN | 114803881 A | 7/2022 |
| CN | 116395382 A | 7/2023 |
| JP | 2985537 B2 | 6/1994 |
| KR | 2019-0117422 A | 10/2019 |
| KR | 20190140316 A | 12/2019 |
| KR | 20230039881 A | 3/2023 |
| WO | 2023/019740 A1 | 2/2023 |
| WO | 2025/087764 A1 | 5/2025 |

OTHER PUBLICATIONS

International Searching Authority, "Notification of Transmittal of the International Search Report and the Written Opinion of the International Searching Authority, or Declaration," Patent Cooperation Treaty, Jan. 24, 2025, 19 pages, International Application No. PCT/ EP2024/079171.

IBM, "IBM Robotic Process Automation", https://www.ibm.com/products/robotic-process-automation, Accessed on Oct. 18, 2023, 16 Pages.

IBM, "The Total Economic Impact™ Of IBM Robotic Process Automation". https://www.ibm.com/account/reg/us-en/signup?formid=urx-51365, Accessed on Oct. 18, 2023, 3 Pages.

Kimax, "Permanent Magnetic Coupling", https://energy-division. kimaxcontrols.com/permanent-magnetic-coupling-introduction/, Accessed on Aug. 30, 2023, 6 Pages.

Leclair, "Upper Bound to Mechanical Power Transmission Losses in Wire Rope", Journal of Engineering Mechanics—asce, Sep. 1, 1989, 4 Pages. https://ascelibrary.org/doi/10.1061/%28ASCE% 290733-9399%281989%29115%3A9%282011%29.

* cited by examiner

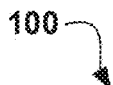

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

POWER GENERATION PROGRAM 150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

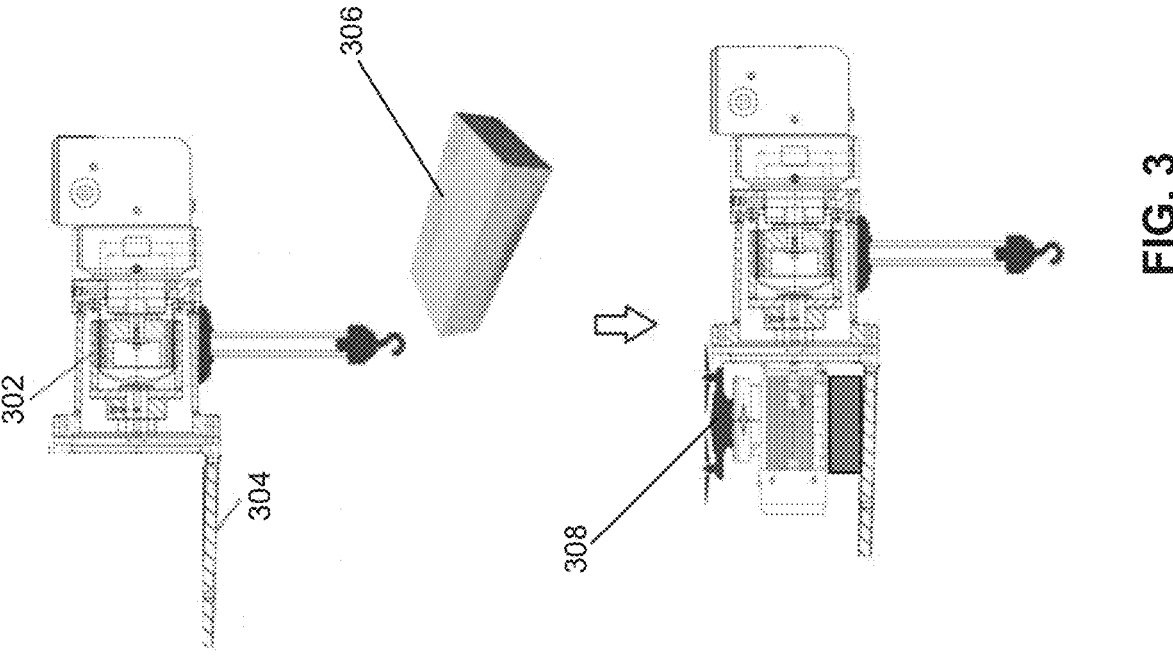
FIG. 3

MATERIAL MOVEMENT CONTROL WITH SWARM POWER GENERATING ROBOTS

BACKGROUND

The present invention relates generally to the field of computing, and more particularly to a system for controlling material movement with swarm power generating robots in a multi-machine environment.

A magnetic coupling is a type of coupling that moves torque from one shaft to another by transferring power to centrifugal pumps. The magnetic coupling uses a magnetic field to transfer power and requires no physical connection between objects. Poles of inverse polarity may face each other and draw in one another because of magnetic transition. Most conventional couplings are in the form of contact couplings, whereas in magnetic coupling, a gap may exist between the objects. For example, there is no physical connection between a motor and a load shaft.

SUMMARY

According to one embodiment, a method, computer system, and computer program product for controlling material movement with swarm power generating robots in a multi-machine environment is provided. The embodiment may include receiving data relating to an activity and one or more material handling devices to perform the activity. The embodiment may also include identifying one or more characteristics of one or more objects associated with the activity. The embodiment may further include predicting an amount of power required to transport the one or more objects based on the one or more characteristics. The embodiment may also include in response to determining at least one material handling device is unable to produce the required amount of power, identifying one or more power generation robots capable of transmitting the required amount of power to the at least one material handling device. The embodiment may further include deploying the one or more power generation robots to a target location of the at least one material handling device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

FIG. 3 is an exemplary diagram depicting a power generation robot providing power to a material handling device according to at least one embodiment.

DETAILED DESCRIPTION

Figure 2:
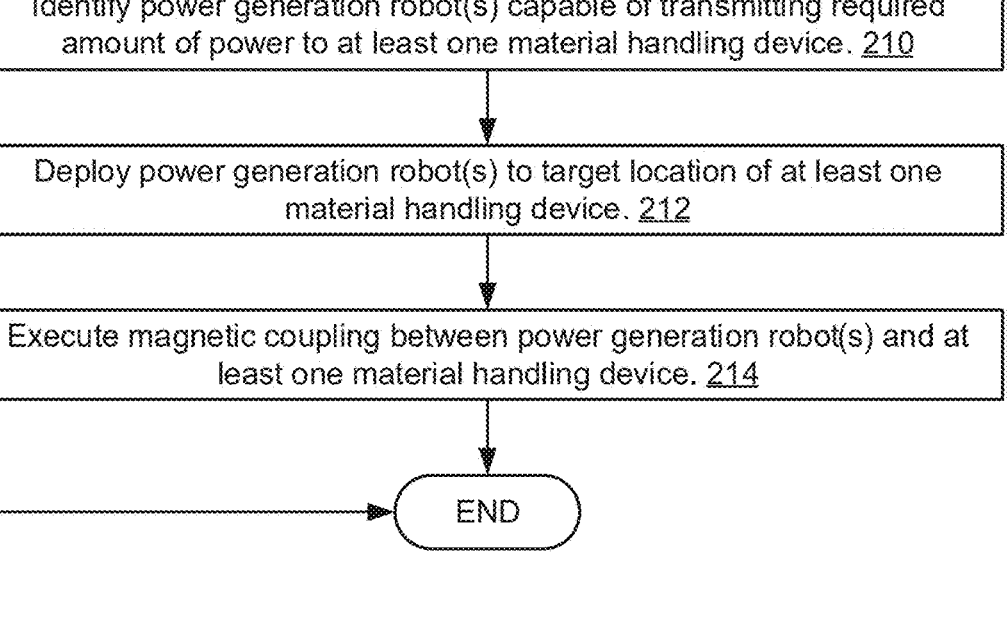
FIG. 2 illustrates an operational flowchart for controlling material movement with swarm power generating robots in a multi-machine environment in a swarm power generation process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for controlling material movement with swarm power generating robots in a multi-machine environment. The following described exemplary embodiments provide a system, method, and program product to, among other things, identify one or more power generation robots capable of transmitting a required amount of power to at least one material handling device and, accordingly, deploy the one or more power generation robots to a target location of the at least one material handling device. Therefore, the present embodiment has the capacity to improve industrial technology by reducing mechanical power transmission loss.

As previously described, a magnetic coupling is a type of coupling that moves torque from one shaft to another by transferring power to centrifugal pumps. The magnetic coupling uses a magnetic field to transfer power and requires no physical connection between objects. Poles of inverse polarity may face each other and draw in one another because of magnetic transition. Most conventional couplings are in the form of contact couplings, whereas in magnetic coupling, a gap may exist between the objects. For example, there is no physical connection between a motor and a load shaft. When handling material in the multi-machine environment, not every device has the requisite power to handle the material. This problem is typically addressed by storing energy in an energy storage system. However, storing energy fails to reduce the number of nodes of power transmission, and thus mechanical power transmission loss.

It may therefore be imperative to have a system in place to reduce the number of nodes of power transmission.

According to at least one embodiment, a computer-based method, computer system, and computer program product for controlling material movement with swarm power generating robots in a multi-machine environment is provided. The method comprises receiving data relating to an activity and one or more material handling devices to perform the activity, identifying one or more characteristics of one or more objects associated with the activity, predicting an amount of power required to transport the one or more objects based on the one or more characteristics, determining whether at least one material handling device of the one or more material handling devices is unable to produce the required amount of power, in response to determining the at least one material handling device is unable to produce the required amount of power, identifying one or more power generation robots capable of transmitting the required amount of power to the at least one material handling device, and deploying the one or more power generation robots to a target location of the at least one material handling device. This embodiment has the advantage of reducing mechanical power transmission loss.

According to at least one embodiment, the method may further comprise executing a magnetic coupling between the one or more power generation robots and the at least one material handling device. This embodiment has the advantage of providing a contactless coupling between the one or more power generation robots and the at least one material handling device.

According to at least one embodiment, executing the magnetic coupling between the one or more power generation robots and the at least one material handling device may further comprise aligning the one or more power generation robots at the target location with a power receiving shaft of the at least one material handling device. This embodiment has the advantage of reducing the nodes of power transmission.

According to at least one embodiment, the target location may be a platform connected to and extending from the at least one material handling device. This embodiment has the advantage of supporting the one or more power generation robots.

According to at least one embodiment, the one or more power generation robots may be physically coupled to the platform. This embodiment has the advantage of providing additional support to the one or more power generation robots.

According to at least one embodiment, deploying the one or more power generation robots to the target location of the at least one material handling device may further comprise adapting a gap size between the one or more power generation robots and the at least one material handling device based on the required amount of power. This embodiment has the advantage of dynamically transmitting mechanical power between the one or more power generation robots and the at least one material handling device.

According to at least one embodiment, the power generation robot may be a drone. The drone has the advantage of flying to the target location. According to at least one embodiment, the power generation robot may be an automated guided vehicle (AGV). The AGV has the advantage of providing more power to the at least one material handling device.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify one or more power generation robots capable of transmitting a required amount of power to at least one material handling device and, accordingly, deploy the one or more power generation robots to a target location of the at least one material handling device.

Referring to FIG. 1, an exemplary computing environment 100 is depicted, according to at least one embodiment. Computing environment 100 contains an example of an environment for the execution of at least some of the computer code involved in performing the inventive methods, such as a power generation program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include an AGV, a power generation robotic device, a conveyor belt, a crane, a lift, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the power generation program 150 may be a program capable of receiving data relating to an activity and one or more material handling devices to perform the activity, identifying one or more power generation robots capable of transmitting a required amount of power to at least one material handling device, and deploying the one or more power generation robots to a target location of the at least one material handling device. Furthermore, notwithstanding depiction in computer 101, the power generation program 150 may be stored in and/or executed by, individually or in any combination, end user device 103, remote server 104, public cloud 105, and private cloud 106. The power generation method is explained in further detail below with respect to FIG. 2. It may be appreciated that the examples described below are not intended to be limiting, and that in embodiments of the present invention the parameters used in the examples may be different.

Referring now to FIG. 2, an operational flowchart for controlling material movement with swarm power generating robots in a multi-machine environment in a swarm power generation process 200 is depicted according to at least one embodiment. At 202, the power generation program 150 receives the data relating to the activity and the one or more material handling devices to perform the activity. As used herein, "material handling device" means a device that is used to transport objects from one location to another.

The data relating to the activity may include the type of activity to be performed in the multi-machine environment. Examples of an activity may include, but are not limited to, assembling objects in a manufacturing facility, removing objects in a disaster recovery area, and transporting objects from one location to another, (e.g., moving a shipping container from a ship to a dock). The data relating to the activity may also include the one or more objects associated with the activity. Examples of an object may include, but are not limited to, a shipping container, an automobile, a device on an assembly line, construction materials, and/or any object capable of being moved from a source to a destination, i.e., from one location to another.

The data relating to the one or more material handling devices to perform the activity may include the types of machines to perform the activity. Examples of a material handling device may include, but are not limited to, a crane, an automated device, an excavator, a conveyor belt, a track-mounted structure (e.g., a pully system) and/or any other device known in the art capable of moving objects from a source to a destination, i.e., from one location to another.

Then, at 204, the power generation program 150 identifies the one or more characteristics of the one or more objects associated with the activity. The one or more characteristics of the one or more objects may include the dimensions, weight, and/or type of materials (e.g., iron, steel, rubber, concrete, or plastic) of the one or more objects. According to at least one embodiment, the power generation program 150 may identify the one or more characteristics based on the types of objects associated with the activity. For example, when the data received with respect to step 202 above indicates that the object is one or more shipping containers, the power generation program 150 may access a database, such as remote database 130, to obtain the typical weight, dimensions, and materials of a shipping container. According to at least one other embodiment, the power generation program 150 may obtain the one or more characteristics from a sensor attached to the one or more objects. For example, a sensor attached to a device on an assembly line may detect the weight, dimensions, and materials of the device.

Next, at 206, the power generation program 150 predicts the amount of power required to transport the one or more objects. The required amount of power is predicted based on the one or more characteristics. Additionally, the required amount of power may be measured against gravity. For example, the amount of power required to lift a 100 kilogram (kg) object a distance of 50 meters (m) in 50 seconds (s) may be 980 Watts (W).

According to at least one embodiment, where the transportation of the one or more objects requires a change in direction and/or speed, the required amount of power may be predicted based on the entire movement path of the one or more objects. For example, the movement path of the 100 kg object may be as follows: vertically upwards 10 m at 10 km/hr, horizontally 120 m at 20 km/h, vertically downwards 80 m at 20 km/h, and then horizontally 100 m at 30 km/h. In this example, the required amount of power may be 980 W in the vertically upwards direction, 5,880 W in the horizontal direction, 3,920 W in the vertically downwards direction, and 3,266 W in the horizontal direction.

Then, at 208, the power generation program 150 determines whether the at least one material handling device of the one or more material handling devices is unable to produce the required amount of power.

According to at least one embodiment, the determination may be made based on the specifications of the one or more material handling devices. For example, a material handling device that weighs less than 500 kg may not be able to lift a 500 kg object. In another example, a material handling device that has a maximum height 100 m may not be able to lift an object 120 m off the ground.

According to at least one other embodiment, the determination may be made based on historical data relating to the activity. The historical data may include the performances of the one or more material handling devices in transporting the one or more objects in the past, and may be stored in the database, such as remote database 130. For example, where the activity is moving 100 kg bricks from one location to another, and during a similar activity in the past the material handling device was unable to lift the 100 kg bricks off the ground, the determination may be made that the material handling device is unable to produce the required amount of power.

In response to determining the at least one material handling device is unable to produce the required amount of power (step 208, "Yes" branch), the swarm power generation process 200 proceeds to step 210 to identify the one or more power generation robots capable of transmitting the required amount of power to the at least one material handling device. In response to determining the one or more material handling devices are able to produce the required amount of power (step 208, "No" branch), the swarm power generation process 200 ends.

Next, at 210, the power generation program 150 identifies the one or more power generation robots capable of transmitting the required amount of power to the at least one material handling device. As used herein, "power generation robot" means an automated device capable of transmitting mechanical power via a magnetic coupling. Examples of the power generation robot may include, but are not limited to, the AGV and/or the drone. The one or more power generation robots may be swarm robots. Additionally, the power generation program 150 may identify the number of power generation robots that are available for use in the multimachine environment. For example, there may be five power generation robots that have the requisite capability.

According to at least one embodiment, the power generation program 150 may identify the specifications of the one or more power generation robots. For example, the power generation robot may weigh approximately 500 kg and have a height of 3 m. The specifications may also include the amount of torque that is able to be transferred from the one or more power generation robots to the at least one material handling device. In this embodiment, the one or more power generation robots having the requisite capability may be identified based on the specifications. For example, a power generation robot that weighs more than 500 kg may be able to lift a 500 kg object.

According to at least one other embodiment, the one or more power generation robots having the requisite capability may be identified based on the historical data. The historical data may include the performances of the one or more power generation robots in transmitting the required amount of power in the past, and may be stored in the database, such as remote database 130. For example, where the activity is moving 100 kg bricks from one location to another, and during a similar activity in the past the material handling device was unable to lift the 100 kg bricks off the ground, and where a particular power generation robot was able to transmit the required amount of power for the at least one material handling device to successfully perform the activity, that particular power generation robot may be identified as being capable of transmitting the required amount of power to the at least one material handling device.

Then, at 212, the power generation program 150 deploys the one or more power generation robots to the target location of the at least one material handling device. The power generation program 150 may send a signal to the one or more power generation robots to deploy the one or more power generation robots to the target location. For example, one or more drones and/or one or more AGVs may be deployed to the target location. The one or more drones may fly to the target location, whereas the one or more AGVs may move along the ground to the target location.

According to at least one embodiment, the target location may be a platform connected to and extending from the at least one material handling device, as illustrated in FIG. 3. When the one or more power generation robots are deployed, the one or more power generation robots may be physically coupled to the platform. For example, the one or more power generation robots may be physically coupled to the platform by a lock. According to at least one other embodiment, the platform may be raised and lowered from the at least one material handling device in response to determining the deployed power generation robot is the one or more AGVs. For example, a ground-based AGV may not be able to reach a material handling device that is 5 m off the ground. In this manner, the platform may enable the one or more power generation robots to reach the at least one material handling device.

According to at least one further embodiment, deploying the one or more power generation robots to the target location of the at least one material handling device may include adapting the gap size between the one or more power generation robots and the at least one material handling device based on the required amount of power. Since torque is transferred across an adjustable gap, varying the gap may change the strength of the magnetic field. A smaller gap size may result in a stronger magnetic field, and thus a greater transmission of torque. For example, where the required amount of power is 980 W, and the current gap size only allows for a transmission of 700 W, the gap size may be reduced to transmit the required amount of power.

According to at least one other embodiment, multiple power generation robots may be required to transmit the required amount of power to the at least one material handling device. The multiple power generation robots may be required when no individual power generation robot is able to transmit the required amount of power. In this embodiment, the multiple power generation robots may be deployed to the target location. For example, the drone and the AGV may be deployed to the platform to transmit the required amount of power.

Next, at 214, the power generation program 150 executes the magnetic coupling between the one or more power generation robots and the at least one material handling device. It may be appreciated that in embodiments of the present invention, no physical contact is required between the one or more power generation robots and the at least one material handling device to transmit the required amount of power since the power is transmitted via a magnetic field. Upon being deployed to the target location, the one or more power generation robots may automatically activate a power transmission module to transmit the required amount of power to the at least one material handling device. For example, the drone may activate the power transmission module to transmit the required amount of power to the at least one material handling device, as illustrated in FIG. 3.

According to at least one embodiment, executing the magnetic coupling between the one or more power generation robots and the at least one material handling device may include aligning the one or more power generation robots at the target location with the power receiving shaft of the at least one material handling device.

According to at least one other embodiment, the one or more power generation robots may be reassigned to at least one different material handling device after the execution of the magnetic coupling with the at least one material handling device is completed. For example, the drone and/or the AGV may be deployed to the at least one different material handling device after the at least one material handling device successfully transports the one or more objects.

Referring now to FIG. 3, an exemplary diagram 300 depicting a power generation robot 308 providing power to a material handling device 302 is shown according to at least one embodiment. In the diagram 300, the material handling device 302 may include a platform 304 that is connected to an extends from the material handling device 302. The platform 304 may be a flat surface which moves along with the material handling device 302. The material handling device 302 may be assigned to transport an object 306 from one location to another. For example, the object 306 may be one or more bricks in the multi-machine environment. As described above with respect to the description of FIG. 2, in response to determining the material handling device 302 is unable to produce the required amount of power to transport the object 306, the power generation robot 308 may be deployed to transmit the required amount of power to the material handling device 302. For example, the power generation robot 308 may be a drone that flies up to the platform 304. The power generation robot 308 may transmit the required amount of power to the material handling device 302 to move the object 306 from the one location to the other location.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of controlling material movement with swarm power generating robots in a multi-machine environment, the method comprising:
   receiving data relating to an activity and one or more material handling devices to perform the activity;
   identifying one or more characteristics of one or more objects associated with the activity;
   predicting an amount of power required to transport the one or more objects based on the one or more characteristics;
   determining whether at least one material handling device of the one or more material handling devices is unable to produce the required amount of power;
   in response to determining the at least one material handling device is unable to produce the required amount of power, identifying one or more power generation robots capable of transmitting the required amount of power to the at least one material handling device; and
   deploying the one or more power generation robots to a target location of the at least one material handling device.

2. The computer-based method of claim 1, further comprising:
   executing a magnetic coupling between the one or more power generation robots and the at least one material handling device.

3. The computer-based method of claim 2, wherein executing the magnetic coupling between the one or more power generation robots and the at least one material handling device further comprises:
   aligning the one or more power generation robots at the target location with a power receiving shaft of the at least one material handling device.

4. The computer-based method of claim 2, wherein the target location is a platform connected to and extending from the at least one material handling device.

5. The computer-based method of claim 4, wherein the one or more power generation robots are physically coupled to the platform.

6. The computer-based method of claim 2, wherein deploying the one or more power generation robots to the target location of the at least one material handling device further comprises:

adapting a gap size between the one or more power generation robots and the at least one material handling device based on the required amount of power.

7. The computer-based method of claim 2, wherein the power generation robot is selected from a group consisting of a drone and an automated guided vehicle (AGV).

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving data relating to an activity and one or more material handling devices to perform the activity;

identifying one or more characteristics of one or more objects associated with the activity;

predicting an amount of power required to transport the one or more objects based on the one or more characteristics;

determining whether at least one material handling device of the one or more material handling devices is unable to produce the required amount of power;

in response to determining the at least one material handling device is unable to produce the required amount of power, identifying one or more power generation robots capable of transmitting the required amount of power to the at least one material handling device; and deploying the one or more power generation robots to a target location of the at least one material handling device.

9. The computer system of claim 8, the method further comprising:

executing a magnetic coupling between the one or more power generation robots and the at least one material handling device.

10. The computer system of claim 9, wherein executing the magnetic coupling between the one or more power generation robots and the at least one material handling device further comprises:

aligning the one or more power generation robots at the target location with a power receiving shaft of the at least one material handling device.

11. The computer system of claim 9, wherein the target location is a platform connected to and extending from the at least one material handling device.

12. The computer system of claim 11, wherein the one or more power generation robots are physically coupled to the platform.

13. The computer system of claim 9, wherein deploying the one or more power generation robots to the target location of the at least one material handling device further comprises:

adapting a gap size between the one or more power generation robots and the at least one material handling device based on the required amount of power.

14. The computer system of claim 9, wherein the power generation robot is selected from a group consisting of a drone and an automated guided vehicle (AGV).

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving data relating to an activity and one or more material handling devices to perform the activity;

identifying one or more characteristics of one or more objects associated with the activity;

predicting an amount of power required to transport the one or more objects based on the one or more characteristics;

determining whether at least one material handling device of the one or more material handling devices is unable to produce the required amount of power;

in response to determining the at least one material handling device is unable to produce the required amount of power, identifying one or more power generation robots capable of transmitting the required amount of power to the at least one material handling device; and deploying the one or more power generation robots to a target location of the at least one material handling device.

16. The computer program product of claim 15, the method further comprising:

executing a magnetic coupling between the one or more power generation robots and the at least one material handling device.

17. The computer program product of claim 16, wherein executing the magnetic coupling between the one or more power generation robots and the at least one material handling device further comprises:

aligning the one or more power generation robots at the target location with a power receiving shaft of the at least one material handling device.

18. The computer program product of claim 16, wherein the target location is a platform connected to and extending from the at least one material handling device.

19. The computer program product of claim 18, wherein the one or more power generation robots are physically coupled to the platform.

20. The computer program product of claim 16, wherein deploying the one or more power generation robots to the target location of the at least one material handling device further comprises:

adapting a gap size between the one or more power generation robots and the at least one material handling device based on the required amount of power.

* * * * *